March 22, 1955  V. M. MACHA ET AL  2,704,838
SPRING CLIP CONTACTS

Filed Feb. 15, 1951  2 Sheets-Sheet 1

INVENTORS
Victor M. Macha and
BY John D. Puette

Harry P. Canfield
ATTORNEY

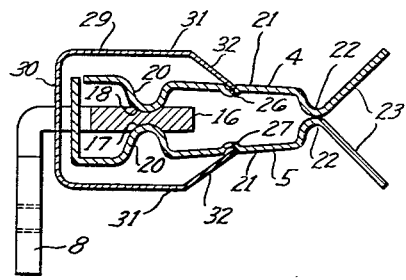
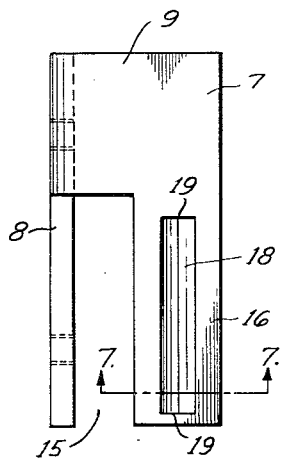
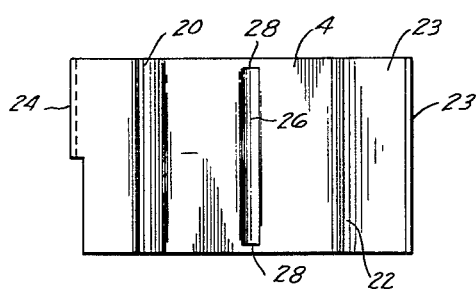
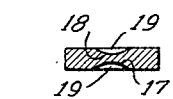
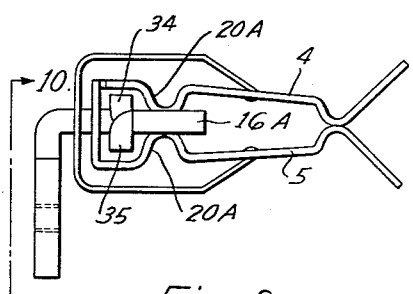
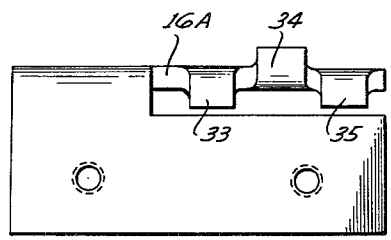

United States Patent Office 2,704,838
Patented Mar. 22, 1955

2,704,838

SPRING CLIP CONTACTS

Victor M. Macha, Oberlin, and John D. Puette, Cleveland Heights, Ohio, assignors to The Clark Controller Company, Cleveland, Ohio, a corporation of Ohio Application February 15, 1951, Serial No. 211,042

2 Claims. (Cl. 339—259)

This invention relates to electric contact devices of the spring-clip class as are utilized to connect an electrical apparatus to, or disconnect it from, current-supplying conductors.

One known type of such device has been developed particularly for use with electrical apparatus of the movable drawer type or truck type, guided for movement bodily toward and from an electric bus bar; and comprises a pair of blades which move with the apparatus and make contact with the bus bar by embracing it between the blades with spring-effected pressure. The present invention is a device of this type.

Among the objects of the invention are:

To provide a device of the aforesaid type having an improved construction and mode of operation;

To provide such a device, the parts of which may be formed from sheet metal in power press forming dies, and assembled without tools, and without screws, bolts, pins, or like connecting or mounting parts; whereby the labor cost of manufacture may be reduced to the minimum;

To provide such a device constructed to automatically adapt itself to make good contact with a bus bar when moved to engage it, in installations wherein the bus bar is not in accurate alignment with the device.

To provide such a device in which the blades are supported in a manner to allow free blade movement for bus-bar contacting purposes, and in which means is provided to stop and limit blade movement to a predetermined maximum, whereby, abuse of the device by accidental blows thereon will not displace the parts out of operating positions.

A preferred embodiment of the invention is fully disclosed in the accompanying drawing and the following description thereof.

The actual invention is that set forth in the claims.

In the drawing:

Fig. 5 is a sectional view from the plane 5—5 of Fig. 1;

Fig. 6 is a view showing separately a support shown assembled in Fig. 1;

Fig. 7 is a cross sectional view from the plane 7—7 of Fig. 6;

Fig. 8 is a view showing separately one of a pair of like contact blades shown assembled in Fig. 1;

Fig. 9 is a view similar to Fig. 2, showing a modification of a support thereof; and Fig. 10 is a view showing separately the support of Fig. 9, the view being taken generally from the plane 10—10 of Fig. 9.

Figure 1:
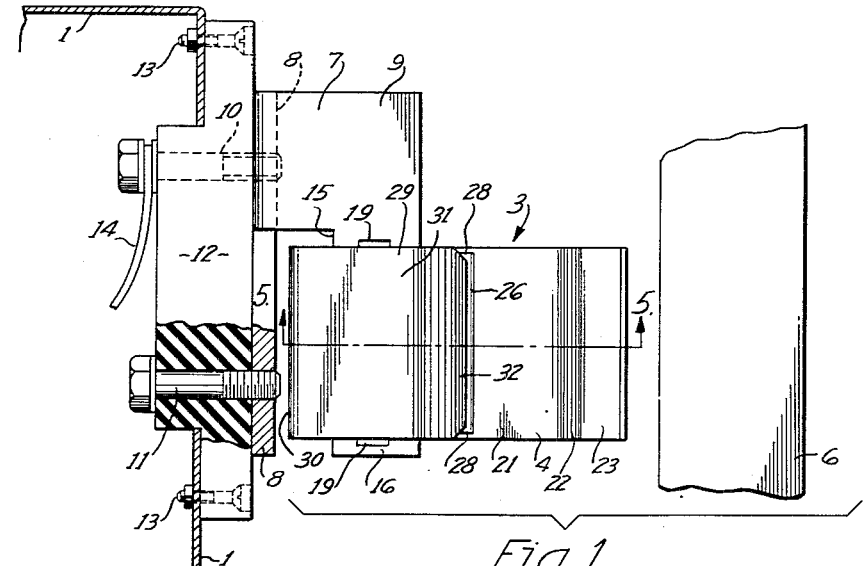
Fig. 1 is a side elevational view of an embodiment of the invention, and showing a fragment of a bus-bar with which contact is to be made.

Referring to the drawing, Figs. 1 to 8, there is indicated at 1 in simplified or diagrammatic form, the enclosing housing or supporting frame-work of an electrical apparatus, for example, a motor controller; and at 2 is indicated one of a pair of guideways or guide rails upon which the housing 1 is reciprocable manually horizontally. At 3 is shown generally a contact device embodying the invention and mounted on the housing 1 and reciprocable bodily therewith, and comprising a pair of blades 4—5; and at 6 is a fragment of an upright bus-bar leading from a source of current, not shown.

Figure 2:
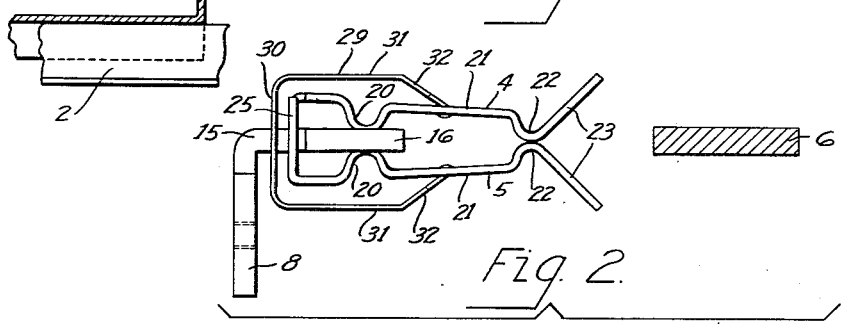
Fig. 2 is a bottom plan view of the parts of Fig. 1.
Figure 3:
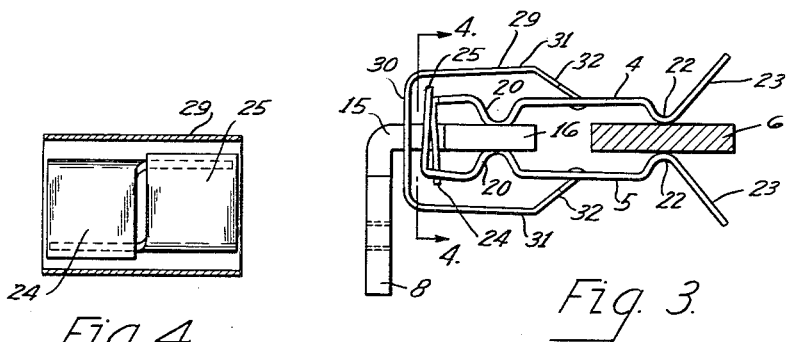
Fig. 3 is a view of the parts as shown in Fig. 2, but after contact has been made with the bus-bar.

In general operation, when the housing 1 is reciprocated toward the right, as viewed in the drawing, the ends of the blades 4—5 straddle and ride up upon opposite sides of the bus-bar embracing it therebetween, as in going from Fig. 2 to Fig. 3, and making electrical contact therewith, and supplying current from the bus-bar to the apparatus in the housing 1; and upon reciprocation in the other direction, the blades leave the bus-bar and isolate the apparatus from the current source, whereby it may be removed for inspection or repair or another substituted therefor. This general construction and mode of operation is known. The invention hereof is embodied in the particular construction of the two-blade contact device 3 and its mounting on the housing 1 and will now be described in detail.

A bracket 7, of thick sheet metal, of good electrical conductivity and comprising vertically elongated flanges 8—9 at right angles to each other, has one flange, 8, mounted by screws 10—11, upon an insulator 12, which is secured upon the housing 1, by screws 13—13.

The screws 10—11 are projected through the insulator 12, and threaded into the flange 8; and the screws are thereby electrically connected to the bracket 7, and the apparatus in the housing 1 may be electrically connected to the bracket 7, by way of the screws, as shown by a wire 14, connected to the screw 10, and going to the apparatus not shown.

The lower portion of the bracket flange 9 is separated from the flange 8, by a relatively wide vertical slot 15, so that it may be referred to as a post 16; and as shown, the post 16 is of rectangular cross section with its longer dimension extending forwardly and rearwardly.

In the opposite faces of the post 16 are vertically elongated, parallel, post recesses 17—18, preferably formed by pressure of a forming die, whereby the opposite ends of the recesses may be closed by end walls 19—19, Figs. 6 and 7.

The blades 4 and 5 referred to above are made from strip sheet metal of good electrical conductivity. They are disposed on opposite sides of the post 16, and are formed in press dies to comprise U-shaped loops 20—20, which are externally part-cylindrical and seated in the post recesses 17—18, of the post 16.

Forwardly of the post 16, the blades have normally converging body portions 21—21, on which are formed mutually confronting beads 22—22 and beyond the beads, the blades terminate in diverging guide portions 23—23.

Rearwardly of the loops 20—20, the blades 4—5 are bent toward each other to provide tongues 24—25, lying behind the post 16, and in the slot 15, and spaced with small clearance from the rear of the post.

Figure 4:
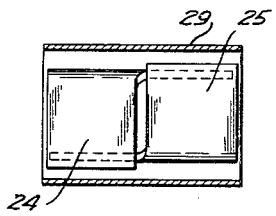
Fig. 4 is a sectional view from the plane 4—4 of Fig. 3.

As best shown in Fig. 4, the vertical extent of the tongues 24—25, on the blades 4 and 5 respectively is about one half of the vertical dimension of the blades themselves, so that the tongue 24 is directly above the tongue 25.

Thus, while the tongue 24 or 25, of each blade 4 or 5, extends transversely substantially to the other blade, and both tongues are behind the post 16, the tongues do not overlap each other but are one above the other and both in a common plane, and both equidistant from the post.

The blades 4 and 5 are identically alike in spite of the difference in the position of the tongues 24 and 25 on the blades, and are both made from identical blanks as will be understood, one being shown in Fig. 8.

On the outer faces of the body portions 21—21 of the blades 4—5, and between the loops 20—20 and the beads 22—22 thereof, the body portions 21 have transverse or vertical blade recesses 26—27 therein, see Figs. 5 and 8, preferably formed by pressure of a die whereby the ends of the recesses may be closed by end walls 28—28. The blade recesses 26—27 are preferably parallel when the blade loops 20—20 are both in the parallel post recesses 17—18.

A generally U-shaped spring 29, formed from flat sheet metal, is provided and disposed with the closed end 30 of the U in the slot 15, and behind the tongues 24—25, and having small clearance therewith, and side legs 31—31 of the U extend forwardly and overlap the rear portions of the blades 4—5, and the free ends of the U legs are bent inwardly as at 32—32, and seated in the blade recesses 26—27.

In operation, when the device is in the retracted position, of Figs. 1 and 2, as referred to, the spring 29 holds the blades 4—5 yieldably toward each other.

This mutually engages the beads 22 with spring pressure and holds the loops 20—20 in the post recesses 17—18 with pressure, and the ends 32—32 of the spring itself are maintained with pressure in the blade recesses 26—27.

The whole device is thus mounted on the vertical post 16, with the blades 4—5 extending forwardly horizontally therefrom, by the pressure engagement of the loops 20—20 in the post recesses 17—18.

Also, the blades cannot slide up or down on the post, either severally or in unison and out of their predetermined position, for example, by mishandling or by an accidental blow on one or both blades, because such undesired excess sliding movement will be stopped by the ends of the loops 20—20 abutting upon the end walls 19—19, of the post recesses 17—18.

Similarly the spring 29, is maintained in position with its U-legs parallel to the blades by the blade recesses 26—27, and cannot be slid up or down excessively nor out of the recesses, because of abutting engagement with the end walls 28—28 of the blade recesses 26—27.

On the other hand, the parts have limited freedom of movement afforded by making the post receses 17—18 and the blade recesses 26—27, slightly longer vertically than the loops 20—20 and the spring ends 32—32, respectively, as shown in Fig. 1.

Also, the ends 32—32 of the spring 29 are thin sheet metal edges, and can slide forwardly and rearwardly in the blade recesses 26—27, so that the blades are free to rock from side to side, as on bearings, by the cylindrical surface engagement of the loops 20—20 with the post recesses 17—18, without disturbing the pressure exerting action of the spring.

When the device is moved forwardly, as referred to, toward the bus-bar 6, the diverging guide portions 23—23 first straddle the edge of the bus-bar, and guide the beads 22—22 to engage the opposite sides of the bus-bar, and then the forward ends of the blades 4—5 are spread apart by the bus-bar, and finally, the beads 22—22 engage the opposite sides of the bus-bar with good electrical contact afforded by the pressure of the spring 29. During this spreading apart of the blades, the loops 20—20 rock in the post recesses as in bearings therefor, and are thereby maintained in good electrical pressure contact with the post 16; whereby, as referred to, current from the bus-bar may flow through the blades to the post 16 and thence to the apparatus in the housing 1, and energize the same.

If the bus-bar and the post 16 happen not to be in alignment with each other, both blades will be rocked to one side or the other, as explained above, and current conducting pressure contact at the beads 22—22 and between the blade loops 20—20 and the post 16, will be maintained, due to the bearing-like engagement of the loops with the post.

If, due to any cause, force is applied to the blades 4—5, tending to move them forwardly excessively and to dislodge the loops 20—20 from the post recesses 17—18, such movement will bring the tongues 24—25 into abutting engagement with the post 16, and prevent such dislodgement.

Similarly, if force is applied to the blades in the rearward direction, the closed end 30 of the spring 29 will be moved to abut upon the flange 8, and prevent dislodgment.

In Figs. 9 and 10, is shown a modification by which rearward excessive or dislodging movement of the blades may be even more effectively prevented. The post, here 16A, has fingers 33, 34, and 35, formed on the rear edge of the post and bent laterally, so as to be behind the loops, here 20A—20A, with small clearance therewith. Dislodging rearward movement of the blades is prevented by abutting of the loops upon the fingers. To balance the abutting engagement, if it should occur, to prevent any tendency for the blades to be forced out of horizontal positions, two tongues 33 and 35 are positioned to be engaged symmetrically by the loop 20A on the blade 5, and one tongue 34 is positioned to be engaged symmetrically by the loop 20A on the blade 4.

The whole device can be disassembled and removed from the post 16 for replacement or renewal of parts, simply by spreading the U-legs of the spring 29, with a suitable tool or lever to remove its pressure from the blades; there being no pins, bolts, screws, rivets or the like in the structure. The blades are mounted on the post 16, by the rotary bearing engagement of the loops 20—20 with the post recesses 17—18, and this engagement is also the current carrying contact between the blades and the post.

It will be understood that the blades 4—5 could be formed as metal castings instead of press formed sheet metal, if preferrred, in which case, the parts 20—20, shown and described as loops, could be elongated protuberances; and in either case, they may be described generically as ribs.

It will be observed that the loops or ribs 20—20 of the blades, when in the post recesses 17—18, mount and position the blades on the post 16; and that the ends 32 of the spring 29, when in the blades recesses 26—27, mount and position the spring on the blades; so that assembly of the spring and blades on the post is effected be merely putting the parts together.

We claim:

1. A contact device comprising a post element adapted to be connected to an electric apparatus to be energized; elongated generally parallel recesses in opposite sides of the post, disposed generally vertical in the normal position of use; a pair of elongated blades having ribs seated in the recesses; the ribs and recesses formed to function as bearings on which the blades may rock on the post; the ribs disposed on the blades so that engagement of the ribs in the recesses, supports the blades on the post to extend forwardly from the post; the blades forwardly of the ribs having mutually confronting contact portions; a U-shaped spring open toward the rear of the blades and its U-legs overlapping the blades and engaging them only at portions between the ribs and contact portions and yieldably holding the contact portions in mutual pressure engagement and yieldably holding the ribs in the recesses with pressure engagement; projections on the blades overlapping and spaced from rearward portions of the post to prevent removal of the blade ribs out of the recesses by excessive forward shifting of the blades.

2. A contact device comprising a post element adapted to be connected to an electric apparatus to be energized; elongated generally parallel recesses in opposite sides of the post, disposed generally vertical in the normal position of use; a pair of elongated blades having ribs seated in the recesses; the ribs and recesses formed to function as bearings on which the blades may rock on the post; the ribs disposed on the blades so that engagement of the ribs in the recesses, supports the blades on the post to extend forwardly from the post; the blades forwardly of the ribs having mutually confronting contact portions; a U-shaped spring open toward the rear of the blades and its U-legs overlapping the blades and engaging them only at portions between the ribs and contact portions and yieldably holding the contact portions in mutual pressure engagement and yieldably holding the ribs in the recesses with pressure engagement; projections on the post, overlapping confronting surfaces provided on the blades forwardly of the projections, to prevent removal of the blade ribs out of the recesses by excessive rearward shifting of the blades.

References Cited in the file of this patent

UNITED STATES PATENTS

| | | |
|---|---|---|
| Re. 20,608 | Koehler | Dec. 28, 1937 |
| 1,988,687 | Jackson | Jan. 22, 1935 |
| 2,300,893 | Hayford | Nov. 3, 1942 |
| 2,303,425 | Bickham | Dec. 1, 1942 |
| 2,504,023 | Horowitz | Apr. 11, 1950 |

FOREIGN PATENTS

| | | |
|---|---|---|
| 269,421 | Germany | Jan. 19, 1914 |
| 603,820 | Germany | Oct. 9, 1934 |
| 931,633 | France | Feb. 27, 1948 |